United States Patent
Neubacher

(10) Patent No.: US 10,492,144 B2
(45) Date of Patent: Nov. 26, 2019

(54) COMMUNICATION SYSTEM COMPRISING MANAGEMENT ENTITY WITH CALLBACK FUNCTIONALITY

(71) Applicant: Deutsche Telekom AG, Bonn (DE)

(72) Inventor: Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 48 days.

(21) Appl. No.: 15/610,636

(22) Filed: Jun. 1, 2017

(65) Prior Publication Data

US 2017/0353927 A1    Dec. 7, 2017

(30) Foreign Application Priority Data

Jun. 2, 2016  (EP) ..................................... 16172735

(51) Int. Cl.
*H04W 52/02* (2009.01)
*H04W 68/00* (2009.01)
(Continued)

(52) U.S. Cl.
CPC ... *H04W 52/0248* (2013.01); *H04W 52/0216* (2013.01); *H04W 68/005* (2013.01);
(Continued)

(58) Field of Classification Search
CPC . H04W 52/02; H04W 52/0216; H04W 84/12; H04W 52/0229; H04W 84/18
(Continued)

(56) References Cited

U.S. PATENT DOCUMENTS 8,285,346 B2 * 10/2012 Fodor ............... H04W 52/0216
455/574
8,335,175 B2 * 12/2012 Das ..................... H04W 88/182
370/311
(Continued)

FOREIGN PATENT DOCUMENTS

EP    1028403 A2    8/2000
EP    2158782 A1    3/2010
(Continued)

*Primary Examiner* — Mang Hang Yeung
*Assistant Examiner* — Sanjay K Dewan
(74) *Attorney, Agent, or Firm* — Leydig, Voit & Mayer, Ltd.

(57) ABSTRACT

A communication system includes: a communication terminal, configured to be ready to communicate within a predetermined time interval; a management entity, coupled with the communication terminal, wherein the predetermined time interval is stored in the management entity; and a communication entity, coupled with the management entity, wherein the communication entity is configured to transmit a connection request for requesting establishment of a communication link to the communication terminal to the management entity at a first time. The management entity is configured to check, responsive to the connection request, whether the first time falls within the predetermined time interval, and if the first time does not fall within the predetermined time interval, to transmit information about a communication time to the communication entity at which communication time the communication terminal is ready to communicate.

15 Claims, 7 Drawing Sheets

(51) Int. Cl.
*H04W 76/10* (2018.01)
*H04W 76/28* (2018.01)

(52) U.S. Cl.
CPC ............ *H04W 76/10* (2018.02); *H04W 76/28* (2018.02); *Y02D 70/12* (2018.01); *Y02D 70/1224* (2018.01); *Y02D 70/1242* (2018.01); *Y02D 70/1262* (2018.01); *Y02D 70/24* (2018.01)

(58) Field of Classification Search
USPC ........................................................ 370/311
See application file for complete search history.

(56) References Cited

U.S. PATENT DOCUMENTS

| | | | | |
|---|---|---|---|---|
| 8,442,025 B2 * | 5/2013 | Borsella | ............... | G10H 1/361 370/349 |
| 8,582,483 B1 * | 11/2013 | Yu | ................... | H04W 52/0216 370/311 |
| 9,301,295 B1 * | 3/2016 | Singh | ............... | H04W 72/0426 |
| 2007/0064662 A1 * | 3/2007 | Bultan | ............ | H04W 52/0225 370/338 |
| 2010/0184458 A1 | 7/2010 | Fodor et al. | | |
| 2012/0275366 A1 * | 11/2012 | Anderson | ......... | H04W 52/0219 370/311 |
| 2012/0300685 A1 * | 11/2012 | Kim | ..................... | H04W 68/02 370/311 |
| 2013/0170415 A1 * | 7/2013 | Fukuta | .............. | H04W 52/0216 370/311 |
| 2013/0258919 A1 * | 10/2013 | Damnjanovic | ... | H04W 52/0209 370/311 |
| 2014/0010132 A1 * | 1/2014 | Ma | ................... | H04W 52/0209 370/311 |
| 2014/0092799 A1 * | 4/2014 | Jain | ........................ | H04W 4/70 370/311 |
| 2014/0161007 A1 * | 6/2014 | Donthi | ............ | H04W 52/0216 370/311 |
| 2014/0286215 A1 * | 9/2014 | Koc | ...................... | H04W 28/24 370/311 |
| 2015/0351147 A1 * | 12/2015 | Jain | .................. | H04W 28/0252 370/329 |
| 2015/0365891 A1 * | 12/2015 | Marcks Von Wurtemberg | .......... | H04W 52/0206 370/311 |
| 2018/0227419 A1 * | 8/2018 | Stojanovski | ....... | H04L 65/1016 |

FOREIGN PATENT DOCUMENTS

| | | | |
|---|---|---|---|
| WO | WO 2008/143563 A1 * | 11/2008 | ............... H04M 1/73 |
| WO | WO 2008143563 A1 | 11/2008 | |
| WO | WO 2015200658 A1 | 12/2015 | |

\* cited by examiner

COMMUNICATION SYSTEM COMPRISING MANAGEMENT ENTITY WITH CALLBACK FUNCTIONALITY

CROSS-REFERENCE TO PRIOR APPLICATIONS

Priority is claimed to European Patent Application No. EP 16172735.9, filed on Jun. 2, 2016, the entire disclosure of which is hereby incorporated by reference herein.

FIELD

The present disclosure relates to a communication system including a management entity with callback functionality which provides responsive to a connection request of a communication entity information about a communication time at which a communication terminal is ready to communicate. The disclosure further relates to a corresponding method for establishing a connection by using callback functionality.

BACKGROUND

For communication with a mobile communication terminal or UE (user equipment), usually the so-called "paging" is performed, e.g. between UE and eNodeB (i.e. the base station) to ensure that the UE can receive data.

In order to be able to react to paging, a UE listens to the so-called paging channels. In order to save energy, the paging channels are not continuously monitored, but only at certain times, the so-called Paging Occasions (PO). For example, if a device listens to the paging channel five times for one second every 10 seconds, the power consumption for the receiving part drops by about 5/10=½ by day, i.e. about 50%.

For the communication between machines or so-called "connected things" on the Internet of Things (IoT), there may be the need for some applications to further reduce the energy consumption of battery-operated transceivers.

A main application case, often referred to in the context of IoT, is the case of massive IoT. In this case, the 5G (fifth generation) communication network should be able to operate and manage the use case of a large number of these components or IoTs. In this context, there is a need to reduce the energy consumption of IoT devices and to keep the impact on the 5G network as low as possible.

A method used to reduce the energy consumption of these devices is the expansion of the so-called DRX (Discontinuous Reception) cycles. In that method, the time interval between two times during which the UE listens to the paging channels is increased. I.e., if the paging channel is listened for example once per day for only one second, then the power consumption is decreased by (86400−1)/86400=0.9999, i.e. by about 99%.

This saving in energy is, however, due to the fact that the terminal can only be reached again once per day for about one second to inform it of upcoming data for the device.

Data traffic to the UE is therefore temporarily stored and transferred to the UE only when the UE is reachable and reacts to a paging. This means, however, that the data must be stored temporarily, which can be very resource-intensive.

SUMMARY

In an exemplary embodiment, the invention provides a communication system. The communication system includes: a communication terminal, configured to be ready to communicate within a predetermined time interval; a management entity, coupled with the communication terminal, wherein the predetermined time interval is stored in the management entity; and a communication entity, coupled with the management entity, wherein the communication entity is configured to transmit a connection request for requesting establishment of a communication link to the communication terminal to the management entity at a first time. The management entity is configured to check, responsive to the connection request, whether the first time falls within the predetermined time interval, and if the first time does not fall within the predetermined time interval, to transmit information about a communication time to the communication entity at which communication time the communication terminal is ready to communicate.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
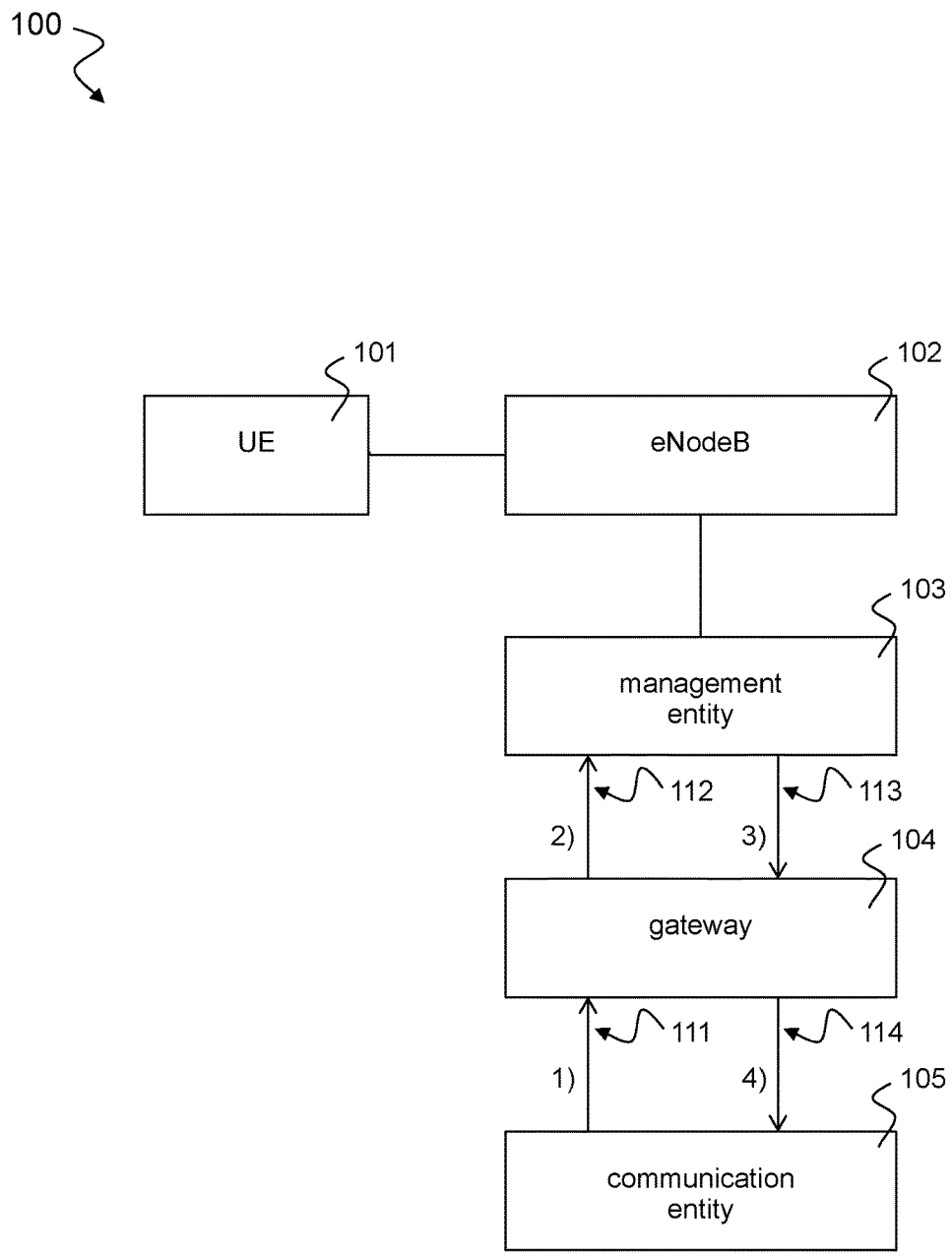
FIG. 1 is a schematic diagram of a communication network 100 with callback functionality according to an exemplary embodiment.

Exemplary embodiments of the present invention provide an efficient solution to the above-described problem, and provide a network concept in which the communication terminals can be operated in an energy efficient fashion and communication with the terminals can be performed in a resource-conserving manner.

The invention is based on the finding that a management entity in the communication network, for example in the case of the LTE (Long Term Evolution) standard a MME (Mobility Management Entity) is aware of the "wake-up times" of a UE and that this information is kept synchronously between eNodeB (i.e. base station) and the management entity.

The network concepts described in the following relate to communication networks, in particular to those of the fifth generation (5G). The fifth generation of mobile technology (5G) addresses the needs and technical challenges of the future communications networks from around the year 2020 and beyond. This approach addresses a fully mobile and networked society, characterized by enormous growth in data traffic as well as mutual networking on several levels.

In 5G, new radio interfaces are needed to meet the demands on higher frequency usage, for example, for new applications such as the Internet of Things (IoT), special capabilities, e.g. lower latency, which go beyond what 4G (fourth generation) communication networks are capable to perform. 5G is considered an end-to-end system that includes all network aspects with a design that allows a high degree of convergence. 5G will take full advantage of today's access mechanisms and their possible further development, including today's fixed-network access technologies for many other access technologies to be developed.

5G will operate in a highly heterogeneous environment, i.e. having multiple types of access technologies, multi-layered networks, diverse types of communications devices and user interactions, etc. Various applications with diametral requirements are to be optimally supported, e.g. failsafe, robust communication, communication with low data rates or broadband communication in densely populated areas. In such an environment, there is a fundamental desire for 5G to achieve a seamless and consistent user experience over time and space. For the operator of a 5G communication network, the necessary resources have to be optimally and dynamically adapted to the respective requirements in order to support the multitude of applications at the same time.

Therefore, there is a need in 5G on the one hand to increase the performance of the communication, in particular to provide a higher data throughput, a lower delay, a particularly high reliability, a much higher connection density and a larger mobility range, and on the other hand to also increase operation flexibility to provide tailored functions with the least possible use of resources. This increased performance is expected along with the ability to control highly heterogeneous environments and the ability to secure users' trust, identity, and privacy.

The devices, methods and systems presented below can be of various types. The individual elements described can be implemented by hardware or software components, for example electronic components, which can be produced by different technologies and may include, for example, semi-conductor chips, ASICs (application-specific integrated circuits), microprocessors, digital signal processors, integrated electrical circuits, electro-optical circuits and/or passive components.

The devices, systems and methods presented below are suitable for transmitting information via a communication network. The term "communications network" or "communications system" refers to the technical infrastructure on which the transmission of signals takes place. The communication network may comprise the switching network, in which the transmission and switching of the signals take place between the stationary stations and platforms of the mobile radio network or fixed network, as well as the access network, in which the transmission of the signals takes place between a network access device and the communication terminal. The communications network can comprise components of a mobile radio network as well as components of a fixed network. In the mobile radio network, the access network is also referred to as the air interface and, for example, comprises a base station (NodeB, eNodeB, radio cell) with a mobile radio antenna for establishing communication with a communication terminal such as a mobile telephone or a mobile device (smartphone) with a mobile radio adapter. In the fixed network, the access network comprises, for example, a DSLAM (digital subscriber line access multiplexer) to connect the communication terminals of several subscribers by wires or cable. Via the switching network, communication can be switched to other networks of for example other network operators like international networks, for example.

The term "callback" used in the following refers not to a callback in the sense of a telephone callback as such, but to the transmission of data or requests, which is newly scheduled at a favorable time.

According to a first aspect, the invention relates to a communication network, comprising: a communication terminal that is ready to communicate within a predetermined time interval; a management entity, coupled with the communication terminal, wherein the predetermined time interval in which the communication terminal is ready to communicate is stored in the management entity; and a communication entity, coupled with the management entity, wherein the communication entity is configured to transmit a connection request to the management entity at a first time, the communication request requesting an establishment of a communication link to the communication terminal, wherein the management entity is configured to check, responsive to the connection request, whether the first time falls within the predetermined time interval in which the communication terminal is ready to communicate, and if the first time does not fall within the predetermined time interval, to transmit information about a communication time to the communication entity in which communication time the communication terminal is ready to communicate.

Such a communication network offers the advantage of a callback function, which is implemented in the management entity. This enables the communication entity to be informed of the time at which a particular communication terminal is ready for communication, in order to set up the communication in a targeted manner. This makes it possible to avoid the fact that various requests for connection set-up have to be stored temporarily or that attempts are made to establish the connection several times and thus generate unnecessary data traffic on the network. With such a communication network, the communication terminals can be operated with energy efficiency and the communication entity can communicate with them in a resource-conserving manner.

In an implementation form of the communication network, the management entity is configured to forward the connection request of the communication entity to the communication terminal if the first time is within the predetermined time interval.

This offers the advantage that the connection can be established immediately if the connection request arrives at a time the communication terminal is ready to communicate. The information about that, i.e. the predetermined time interval is stored in the management entity so that the management entity can immediately check whether the time falls within the predetermined time interval by simply querying the memory.

In an implementation form of the communication network, the information about the communication time comprises a time interval within the predetermined time interval.

This offers the advantage that the communication entity has a certain, i.e. individual communication time at which only this communication entity (and no other communication entity) makes a connection request, so that the communication network is relieved and the connections can be established more quickly.

In an implementation form of the communication network, the information about the communication time indicates the predetermined time interval.

This offers the advantage that the communication entity itself can decide at which time within the predetermined time interval it wishes to initiate a connection request to the communication terminal.

In an implementation form of the communication network, the communication entity is configured to delay the connection request to the management entity based on the information about the communication time until the first time falls within the predetermined time interval.

This offers the advantage that the connection request is temporarily stored in the communication entity itself and that no resources have to be kept for temporary storage in the gateway, in the management entity or in another network node.

In an implementation form the communication network comprises a base station, configured to send a paging request to the communication terminal, wherein the communication terminal is configured to initiate, responsive to the paging request, a connection establishment with the base station within the predetermined time interval in which the communication terminal is ready to communicate.

This provides the advantage that the management entity can perform paging and, based on a response from the communication terminal, obtains information about the predetermined time interval in which the communication terminal is ready for communication. With this information, the management entity can determine the predetermined time interval in which the UE is ready to communicate and store it in a memory in order to respond to communication requests from the communication entity with a callback in which a communication time is specified at which the UE is ready for communication.

In an implementation form of the communication network, the communication terminal is configured to be in a power save mode at times other than the predetermined time interval in which power save mode the paging request is neither received nor answered.

This provides the advantage that the communication terminal is operated with energy efficiency and is nevertheless reachable. In the absence of responses from the UE to the paging request, the management entity can recognize that the UE is currently in the sleep cycle and can update the stored information correspondingly in the predetermined time interval in which the UE is ready to communicate.

In an implementation form of the communication network, the management entity is configured to update the predetermined time interval, in which the communication terminal is ready to communicate, based on a message from the communication terminal, the message indicating that the connection to the base station is established.

This provides the advantage that the predetermined time interval stored in the management entity is always kept up-to-date and can be adapted to changes in the UE's ready to communicate cycle.

In an implementation form of the communication network, the message from the communication terminal indicates the predetermined time interval in which the communication terminal is ready to communicate.

This provides the advantage that the predetermined time interval to which the communication terminal is ready to communicate can be read directly from the message from the UE and can be stored in the management entity.

In an implementation form of the communication network, the management entity is configured to send a paging message to the base station, wherein the paging message indicates the predetermined time interval in which the communication terminal is ready to communicate, and the base station is configured to send the paging request to the communication terminal within the time interval indicated by the paging message.

This provides the advantage that the paging can be executed in a resource-saving fashion, since it only needs to be initiated if the UE is also ready for communication. It saves unnecessary traffic on the air interface.

In an implementation form of the communication network, the management entity is configured to transmit, responsive to a plurality of connection requests of a plurality of communication entities, information to the respective communication entities, the information comprising different communication times within the predetermined time interval in which the communication terminal is ready to communicate.

This provides the advantage that a communication period can be assigned to each communication entity to which only it establishes a communication link to the UE. This avoids unsuccessful connection attempts.

In an implementation form of the communication network, the communication terminal comprises a sensor configured to sense measurement data and wherein the communication terminal is configured to transmit the measurement data to the communication entity responsive to a control command of the communication entity.

This provides the advantage that measurement data from a plurality of sensors can be interrogated efficiently. The sensors can receive their sensor data without having to be always ready for communication. For example, a sensor may be ready to communicate once a day to transmit its sensing data to the communication entity.

In an implementation form of the communication network, the communication network is a fifth generation (5G) network or a network of a further generation, and the management entity is arranged in a management and instrumentation plane of the communication network.

This allows all the advantages of the 5G network structure to be realized, such as higher radio frequencies with higher data throughput, new applications such as, for example, the Internet of Things, special capabilities, e.g. lower latency, which can go beyond what 4G communication networks are capable of. The communications network can provide an end-to-end system that includes all network aspects with a high degree of convergence. Furthermore, the existing access mechanisms and their possible further developments can be fully utilized.

According to a second aspect, the invention relates to a management entity, comprising: an interface with a communication terminal, wherein the communication terminal is ready to communicate within a predetermined time interval; a memory storing information about the predetermined time interval in which the communication terminal is ready to communicate; an interface with a communication entity, wherein the communication entity is configured to transmit a connection request to the management entity at a first time, the communication request requesting an establishment of a communication link to the communication terminal; and a processor, configured to check, responsive to the connection request of the communication entity whether the first time falls within the predetermined time interval in which the communication terminal is ready to communicate, and if the first time does not fall within the predetermined time interval, to transmit information about a communication time to the communication entity in which communication time the communication terminal is ready to communicate.

Such a management entity offers the advantage of a callback function. This enables the communication entity to be informed of the time at which a particular communication terminal is ready for communication, in order to set up the communication in a targeted manner. This makes it possible to avoid the fact that various requests for connection set-up have to be stored temporarily or that attempts are made to establish the connection several times and to generate unnecessary data traffic on the network. With such a management entity, the communication terminals can be operated with energy efficiency and the communication entity can communicate with them in a resource-saving manner.

According to a third aspect, the invention relates to a method for establishing a communication link between a communication entity and a communication terminal which is ready to communicate within a predetermined time interval, the method comprising: transmitting a connection request, by the communication entity to a management entity at a first time, the communication request requesting an establishment of a communication link to the communication terminal, wherein the predetermined time interval in which the communication terminal is ready to communicate is known to the management entity; checking, by the management entity, whether the first time falls within the predetermined time interval in which the communication terminal is ready to communicate, and if the first time does not fall within the predetermined time interval, transmitting, by the management entity, information about a communication time in which communication time the communication terminal is ready to communicate, to the communication entity.

Such a method provides the advantage of a callback function. This enables the communication entity to be informed of the time at which a particular communication terminal is ready for communication, in order to set up the communication in a targeted manner. This makes it possible to avoid the fact that various requests for connection set-up have to be stored temporarily or that attempts are made to establish the connection several times and to generate unnecessary data traffic on the network. With such a method, the communication terminals can be operated in an energy-efficient manner and the communication entity can communicate with them in a resource-conserving manner.

In the following detailed description, reference is made to the accompanying drawings which form a part hereof, and in which are shown by way of illustration specific embodiments in which the invention may be practiced. It will be appreciated that other embodiments may be utilized and structural or logical changes may be made without departing from the concept of the present invention. The following detailed description is, therefore, not to be taken in a limiting sense. Further, it is to be understood that the features of the various embodiments described herein may be combined unless otherwise specified.

The aspects and embodiments are described with reference to the drawings, wherein like reference characters generally refer to like elements. In the following description, for purposes of explanation, numerous specific details are set forth in order to provide a thorough understanding of one or more aspects of the invention. However, it will be apparent to one skilled in the art that one or more aspects or embodiments may be executed with a lesser degree of specific details. In other instances, known structures and elements are presented in schematic form to facilitate describing one or more aspects or embodiments. It is to be understood that other embodiments may be utilized and structural or logical changes may be made without departing from the concept of the present invention.

While a particular feature or aspect of an embodiment may have been disclosed with respect to only one of several implementations, such feature or aspect may be combined with one or more other features or aspects of the other implementations as it may be desirable and advantageous for a given or particular application. Further, to the extent that the terms "contain", "have", "with", or other variants thereof are used either in the detailed description or claims, such terms are intended to be included in a manner similar to the term "include". The terms "coupled" and "connected" may have been used in conjunction with derivatives thereof. It is to be understood that such expressions are used to indicate that two elements independently cooperate with each other or interrelate, whether they are in direct physical or electrical contact, or are not in direct contact with each other. In addition, the term "exemplary" is merely to be taken as an example, rather than as the term for the best or optimum. The following description is, therefore, not to be construed in a limiting sense.

FIG. 1 shows a schematic diagram of a communication network 100 with callback functionality according to an exemplary embodiment.

The communication network 100 comprises a communication terminal, for example a mobile terminal or UE (user equipment) 101, which can establish a communication link via an air interface with a base station (eNodeB). The base station 102 is coupled to a management entity 103 that performs monitoring and control tasks. A communication entity 105, for example a network node or another UE, is connected to the management entity 103 via a gateway 104, for example a PDN GW (Packet Data Network Gateway) or an SGSN (Serving GPRS (General Packet Radio Service) Support Node)/GGSN (Gateway GPRS Support Node). The communication entity 105 can establish a communication link to the communication terminal 101 via the management entity 103. The communication network 100 may, for example, be a 4G or 5G network or any other network in which a communication entity 105 can establish a communication link to a communication terminal 101.

The management entity 103 has a call-back functionality, i.e. the management entity 103 is configured to check, in response to a connection request 111 of the communication entity 105, at a first time t1 whether the first time t1 falls within a predetermined time interval [tA; TB] in which the communication terminal 101 is ready for communication, and if the first time t1 does not fall into the predetermined time interval [tA; TB], the communication entity 105 sends information 114 about a communication time at which the communication terminal 101 is ready to communicate.

This can be realized via steps 1) to 4) described in the following, as illustrated in FIG. 1.

In step 1, the communication entity 105 transmits a connection request 111 to the UE 101 via the gateway 104 and the management entity 103. In the case of LTE, the gateway 104, e.g. the PDN GW, and the management entity 103 may be an MME. In the case of UMTS (Universal Mobile Telecommunications Service)/GSM (Global System for Mobile communication), the gateway 104 may be the GGSN or the SGSN, or a similar node.

In step 2, the corresponding node of the relevant paging entity checks for the next time when the UE 101 is reachable. This node can be the management entity 103, i.e. in the case of LTE the node can be the MME.

In step 3, the management entity (for example the MME in the case of LTE) supplies a corresponding information 113 to the gateway 104 (for example, to the PDN-GW for LTE or to the corresponding user plane node of the SGSN/GGSN for UMTS/GSM) in the case that the UE 101 is not reachable.

In step 4, the gateway 104 transmits an indication 114 of a time interval to the communication entity 105 in which the UE 101 is reachable for the communication entity 105.

The communication entity 105 can then initiate the connection to the UE 101 in this time interval.

With this callback mechanism, the following advantages can be realized: Data traffic to the UE 101 no longer has to be buffered in the network 100. By the scheduling, i.e. the scheduled callback functionality in the management entity 103 an efficient utilization of the wake-up (or readiness) phase of the UE 101 is ensured to communicate with the UE 101. A plurality of communication entities 105 may be scheduled for the UE 101 on this basis, i.e. recalled according to the schedule.

Figure 2:
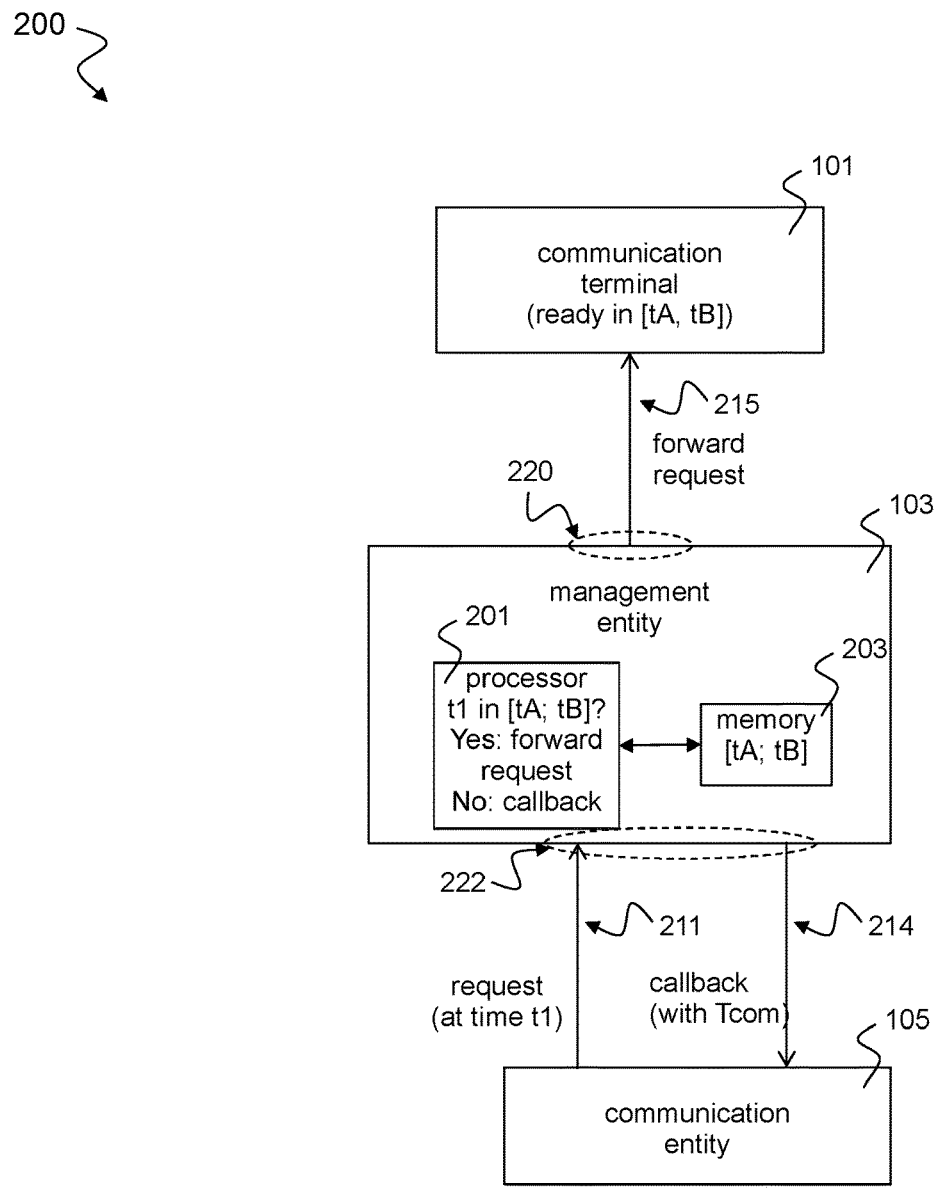
FIG. 2 is a schematic diagram of a communication network 200 with callback functionality in the management entity according to an exemplary embodiment.

FIG. 2 shows a schematic diagram of a communication network 200 with callback functionality in the management entity according to an exemplary embodiment.

The communication network 200 includes a communication terminal, for example a communication terminal 101 as described above with respect to FIG. 1, a management entity, for example a management entity 103 as described above with respect to FIG. 1 and a communication entity, for example a communication entity 105 as described above with respect to FIG. 1.

The communication terminal 101 is ready to communicate within a predetermined time interval [tA; TB]. The management entity 103 is coupled to the communication terminal 101, and the management entity 103 stores the predetermined time interval [tA; TB] in which the communication terminal 101 is ready for communication, for example in the memory 203 of the management entity 103 as shown in FIG. 2.

The communication entity 105 is coupled to the management entity 103. At a first time t1, the communication entity 105 transmits a connection request 211 for establishing a communication connection with the communication terminal 101 to the management entity 103.

The management entity 103, in response to the connection request 211 of the communication entity 105, checks whether the first time t1 falls in the predetermined time interval [tA; tB] in which the communication terminal 101 is ready for communication, for example, via the processor 201 shown in FIG. 2, which can access the memory 203 for this purpose. If the first time t1 does not fall within the predetermined time interval [tA; tB], the management entity 103 transmits information 214 to the communication entity 105 which information indicates a communication time Tcom at which the communication terminal 101 is ready for communication.

The management entity 103 forwards the connection request 211 of the communication entity 105 to the communication terminal 101 if the first time t1 falls within the predetermined time interval [tA; tB].

The information 214 about the communication time Tcom can include a period or a time within the predetermined time interval [tA; tB] or the entire period within the predetermined time interval. The information 214 about the communication time Tcom can further indicate the predetermined time interval [tA; TB].

The communication entity 105 can then delay the connection request 211 to the management entity 103 on the basis of the information 214 about the communication time Tcom until the (new) first time t1 of transmitting the connection request via the management entity 103 to the communication terminal 101 falls within the predetermined time interval [tA; TB].

The communications network 200 may further comprise a base station, for example an eNodeB 102, as described above with respect to FIG. 1, which is configured to transmit a paging request, for example a paging request 502, 503, as described below with respect to FIG. 5, to the communication terminal 101. The communication terminal 101 can, in response to the paging request 502, 503, initiate a connection setup with the base station 102 in the predetermined time interval [tA; TB] in which it is ready to communicate, for example according to the illustration and associated description in FIG. 5.

The communication terminal 101 can be operated in an energy-saving (sleeping) mode outside the predetermined time interval [tA; TB]. In this mode the paging request is not received and/or not answered or no reaction is made to the paging request, for example according to the illustration and the associated description in FIG. 5.

The management entity 103 can update the predetermined time interval [tA; TB] in which the communication terminal 101 is ready to communicate based on a message from the communication terminal 101 indicating that the connection to the base station 102 is established, for example, a service request of the UE or an initial UE message, as described below with respect to FIG. 5 in more detail.

The message from the communication terminal 101 may optionally indicate the predetermined time interval [tA; TB] in which the communication terminal 101 is ready for communication. Alternatively, the reception time of the said message can give the management entity 103 an indication of the predetermined time interval [tA; tB] such that the communication terminal 101 is ready to communicate at this reception time.

Figure 5:
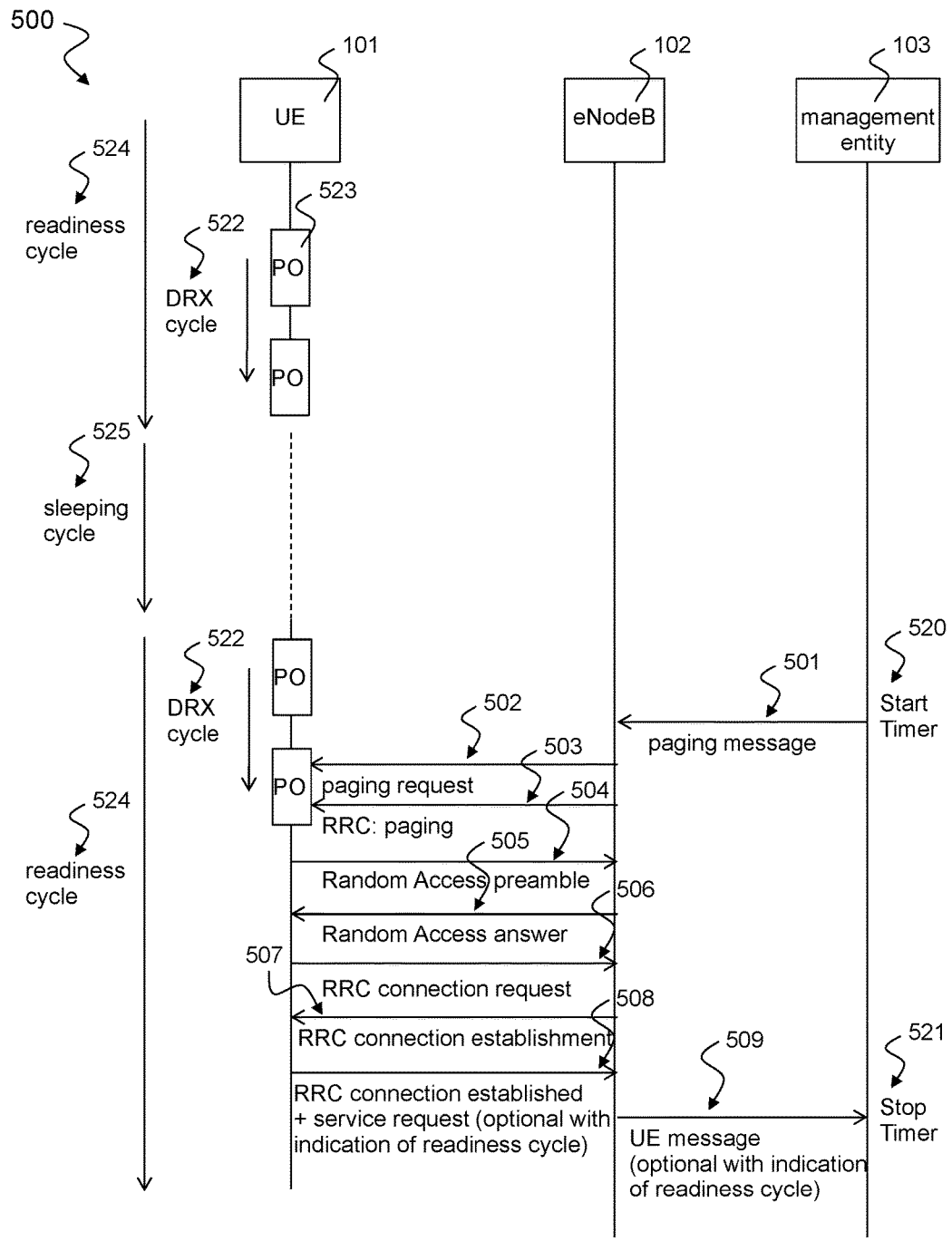
FIG. 5 is a schematic diagram of a method for establishing a communication link from management entity via eNodeB to UE according to an exemplary embodiment.

The management entity 103 can send a paging message, for example a paging message 501 as described in more detail in FIG. 5, to the base station 102. The paging message 501 may include a field with an RNTI (Radio Network Temporary Identifier) for identifying the radio network. The paging message 501 may indicate the predetermined time interval [tA; TB] in which the communication terminal 101 is ready for communication, so that the base station can perform paging at a time within [tA; tB]. The base station can then forward the paging request 502, 503 to the communication terminal 101 within the predetermined time interval [tA; tB] as indicated in the paging message 501.

Figure 4:
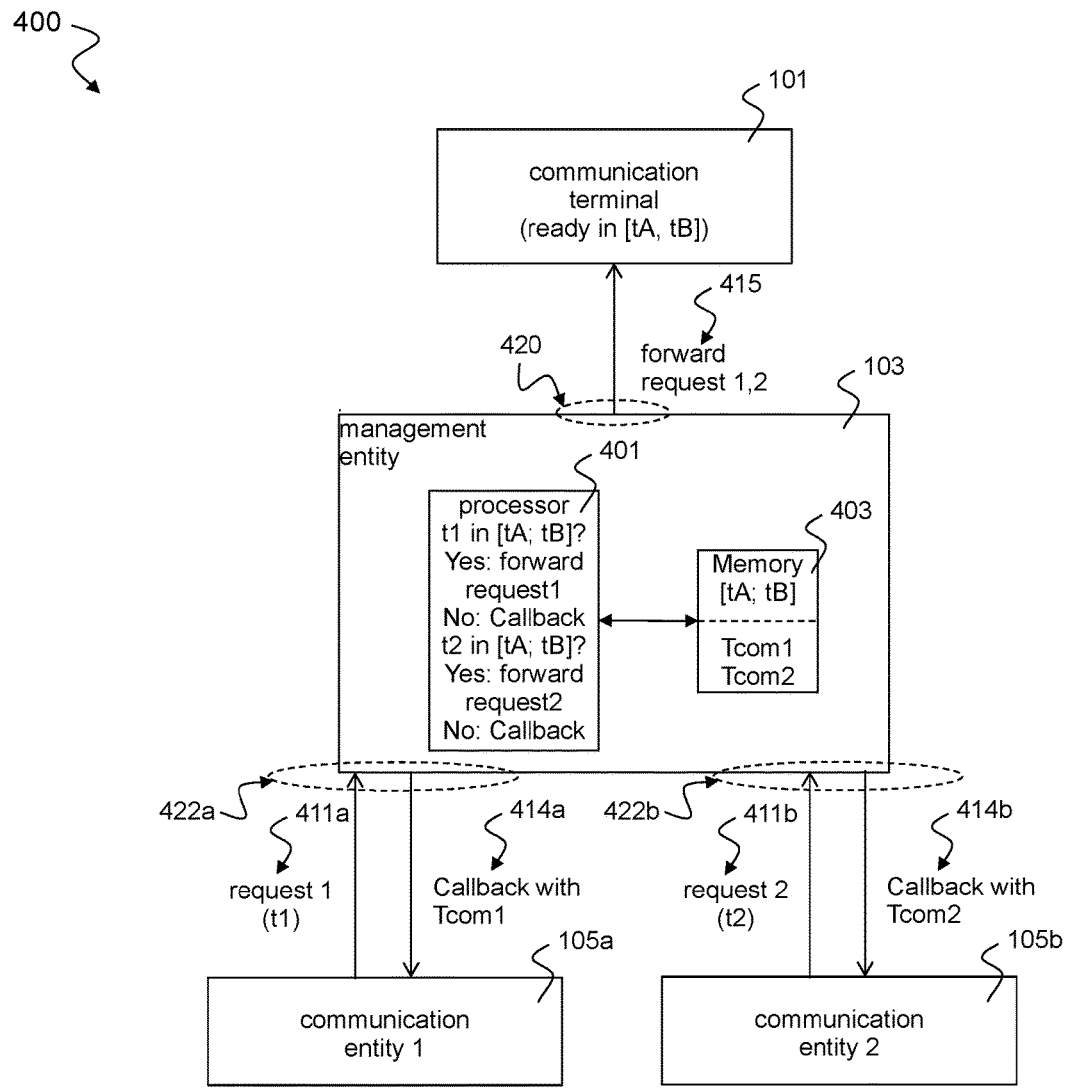
FIG. 4 is a schematic diagram of a communication network 400 with two communication entities, a communication terminal and a management entity with callback functionality according to an exemplary embodiment.

The management entity 103 can also, in response to a plurality of connection requests of a plurality of communication entities, e.g. as described below with reference to FIG. 4, provide the respective communication entities with different communication times within the predetermined time interval [tA; tB] in which the communication terminal 101 is ready for communication.

The communication terminal 101 may, for example, include a sensor which can acquire measurement data and, in response to a control command from the communication entity 105, transmit the measurement data to the communication entity 105.

The communication network 200 may be a fifth generation (5G) or a further generation network, for example, as described in more detail below with reference to FIG. 6, and the management entity 103 may be arranged in a management and instrumentation layer 603 of the communication network 200.

In one embodiment, the management entity 103 includes a first interface 220 with the communication terminal 101, a memory 203 in which information is stored about the predetermined time interval [tA; tB] in which the communication terminal 101 is ready for communication, an interface 222 with the communication entity 105, and a processor 201. The communication entity 105 may transmit, at a first time t1, a connection request 211 for establishing a communication connection with the communication terminal 101 to the management entity 103. The processor 201 can check, in response to the connection request 211 of the communication entity 105, whether the first time t1 falls within the predetermined time interval [tA; tB] in which the communication terminal 101 is ready for communication, and if the first time t1 does not fall within the predetermined time interval [tA; tB], the processor 201 can send information 214 about a communication time Tcom, at which the communication terminal 101 is ready for communication, to the communication entity 105.

Figure 3:
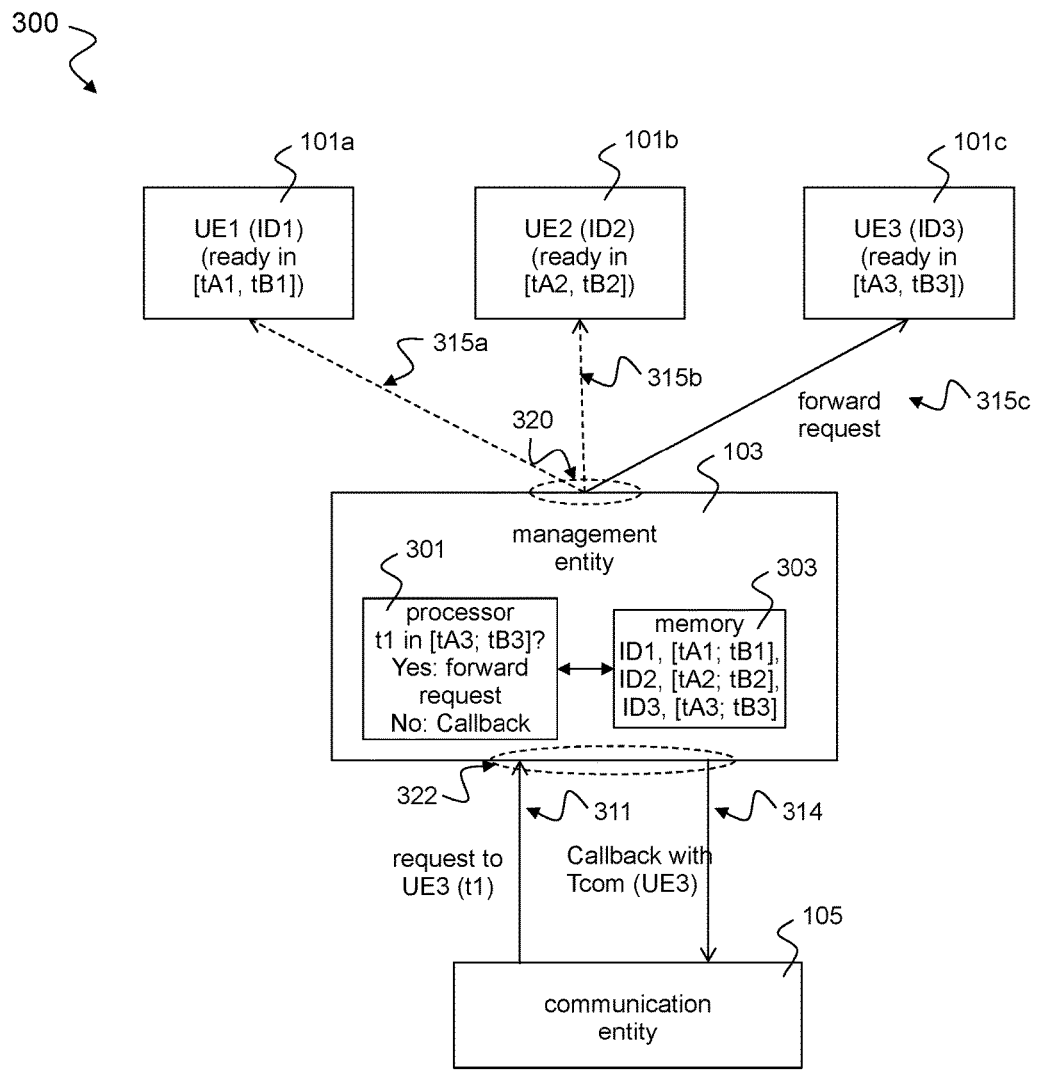
FIG. 3 is a schematic diagram of a communication network 300 with a communication entity, a plurality of communication terminals and a management entity with callback functionality according to an exemplary embodiment.

FIG. 3 shows a schematic diagram of a communication network 300 with a communication entity, a plurality of communication terminals and a management entity with callback functionality according to an exemplary embodiment;

The communication network 300 corresponds to the communication network 200 described above with reference to FIG. 2, wherein the predetermined time intervals of different communication entities 101a, 101b, 101c, which are accessible via the management entity 103 or coupled with the management entity 103, are stored in the management entity 103. The management entity 103 comprises a memory 303 in which, for example, three (or any other number) predetermined time periods [tA1; tB1], [tA2; tB2], [tA3; tB3] of three (or any other number) UEs 101a, 101b, 101c are stored together with the respective identifications of the UEs 101a, 101b, 101c. If the communication entity 105 transmits a request 311 to a particular UE, for example to UE3 with the identification ID3, for establishing a communication connection at time t1, the processor 301 first determines whether an entry with the ID3 is present in the memory, and if Yes, whether the time t1 falls within the associated predetermined time interval [tA3, tB3] stored in the memory in which UE3 101c is ready for communication. If this is the case, the request 311 is passed on 315c to UE3 101c. If this is not the case, the management entity 103 of the communication entity 105 provides the communication entity 105 with information about a communication time Tcom3 at which the UE3 is ready for communication by using the callback functionality implemented in the management entity 103.

The processor 301 can extract the time t1, for example, from a data field of the request 311, which indicates the time at which the request 311 has been sent. The request 311 may, for example, be an Internet protocol message, e.g. an RTP (Real-time Transport Protocol) message in which the transmit time is logged. Alternatively, the processor 301 may determine the time t1 as the time at which the request 311 arrives at the processor 301, for example, based on a time base implemented in the management entity 103.

Further network nodes, for example, one or more gateways 104 may be coupled between management entity 103 and communication entity 105, e.g. as described in FIG. 1. A radio access network with one or more base stations 102 can be connected between management entity 103 and UEs 101a, 101b, 101c, e.g. as described with respect to FIGS. 1 and 5.

Alternatively, the UEs 101a, 101b, 101c may also be stationary communication devices, for example sensors mounted in a building network in a building, service facilities located at a particular location, e.g. at ticket machines, etc. Alternatively, the UEs 101a, 101b, 101c can also be connected via a fixed network, e.g. POTS (plain old telephone service) or ISDN (Integrated Services Digital Network) or xDSL, etc., to the management entity 103. In this scenario, applications are possible in which stationary communication terminals can only be reached at specific time intervals, and the management entity informs them of this via the callback functionality. Applications are, for example, servers, such as e-mail servers, which forward or relay messages only within the recipient's service time or business time period.

FIG. 4 shows a schematic diagram of a communication network 400 with two communication entities, a communication terminal and a management entity with callback functionality according to an exemplary embodiment;

The communication network 400 corresponds to the communications network 200 described above with reference to FIG. 2, wherein the management entity 103 is coupled by two (or more) interfaces 422a, 422b with two (or more) communication entities 105a, 105b. The processor 401 is configured to answer various connection requests from various communication entities 105a, 105b.

Thus, in the management entity 103, the processor 401 can check whether the first time t1 at which the first connection request 411a has been sent falls within the predetermined time interval [tA; tB] in which the communication terminal 101 is ready to communicate. If the first time t1 does not fall within the predetermined time interval [tA; TB], the processor 401 can transmit an information 414a to the first communication entity 105a which information 414a indicates a first communication time Tcom1 at which the communication terminal 101 is ready for communication.

The processor 401 may also check, responsive to the second connection request 411b of the second communication entity 105b, whether the second time t2 at which the second connection request 411b has been sent falls within the predetermined time interval [tA; tB] at which the communication terminal 101 is ready for communication. If the second time t2 does not fall within the predetermined time interval [tA; tB], the processor 401 can transmit an information 414b to the second communication entity 105b which information 414b indicates a second communication time Tcom2 at which the communication terminal 101 is ready for communication.

The first communication time Tcom1 and the second communication time Tcom2 can include times or time sections within the predetermined time interval [tA; tB] at which the communication terminal is ready for communication. The management entity can store both communication times Tcom1 and Tcom2 in the memory 403. The management entity can send the information 414b about the second communication time Tcom2, for example, depending on the information 414a about the first communication time Tcom1 in order to avoid conflicts between the two communication entities 105a, 105b when establishing a communication with the communication terminal 101.

Alternatively, the management entity 103 can control the communication setup such that the communication link to the communication terminal 101 is established only once and the communication entities 105a, 105b can communicate with the communication terminal 101 one after the other via the established communication connection.

In a further embodiment, the management entity 103 is configured such that it can provide a callback between a plurality of communication entities 105a, 105b as described in FIG. 4 and a plurality of communication terminals 101a, 101b, 101c as described in FIG. 3. That means, a combination of the communication networks 300, 400 described in FIGS. 3 and 4 is possible.

FIG. 5 shows a schematic diagram of a method for establishing a communication link from management entity via eNodeB to UE according to an exemplary embodiment.

The communication network 500 corresponds to the communications networks 100, 200 described above with reference to FIGS. 1 and 2, wherein the management entity 103 is coupled to the UE 101 or communication terminal via a base station or eNodeB 102. The UE 101 is ready for communication in a stand-by (or readiness) cycle 524, which corresponds to the predetermined time interval mentioned above with reference to FIGS. 1 to 4. In a power-saving mode or sleeping cycle 525 the UE 101 is not ready for communication.

The standby (readiness) cycle 524 may include a plurality of DRX (Discontinuous Reception mode) cycles 522, each with a plurality of so-called "Paging Occasions" (PO), e.g. according to 3GPP (3rd Generation Partnership Project), in which the UE 101 listens to paging messages from the base station 102 and is ready to receive such paging messages. When the UE 101 is in the RRC (Radio Resource Control) IDLE mode, it uses DRX to reduce its power consumption. The DRX cycle determines how often the UE listens for paging messages. The DRX cycle may, for example, comprise values of 32, 64, 128 or 256 radio frames corresponding to time intervals of 320, 640, 1280 or 2560 milliseconds.

As shown in FIG. 5, the management entity 103 is responsible for initiating the paging procedure. This is done by transmitting a paging message 501 to one or more eNodeBs 102. The paging message 501 may, for example, be a S1AP (S1 Application Protocol) paging message and may be constructed as shown in Table 1.

TABLE 1

Example of the structure of a paging message 501

| information element (IE) | Value |
| --- | --- |
| UE identification index | 0-1023 |
| UE paging identification | S-TMSI or IMSI |
| paging DRX cycle | 32, 64, 128, 256 |
| Network domain | PS or CS |
| List of Tracking Area identifications (TAI) | 1-256 instances |
| List of closed subscriber group identifications (CSG) | 0-256 instances |
| Optional: time interval, in which the UE is ready to communicate | Start time standby cycle, time length standby cycle, time length sleeping cycle |

With the time interval optionally indicated in the paging message 501, in which the UE 101 is ready for communication, the management entity 103 can start the paging for the corresponding UE 101 optionally at this time interval so as to save unnecessary data traffic on the air interface.

The management entity 103 can forward the paging message 501 to a plurality of eNodeBs 102, since the UE 101 may be registered with a plurality of eNodeBs 102. After the paging message 501 is sent, the management entity 103 can start a timer 520. The eNodeB 102 receives this paging message 501 from the management entity 103 and generates a paging request 502 with a Paging Radio Network Temporary Identifier P-RNTI in which the UE 101 is informed that an RRC (Radio Resource Control) paging message 503 is present on the paging channel.

Subsequently, the UE 101 sends a Random Access (RA) preamble 504 to the eNodeB 102, which responds with an RA response to allocate a radio channel resource. The UE sends an RRC connection request 507 via the radio channel resource to the eNodeB 102 which confirms a connection establishment via the radio channel 508. Finally, the UE 101 responds with an acknowledgment 508 that the connection establishment is completed via the radio channel and sends a service request to the eNodeB. Optionally, this acknowledgment 508 may include the time interval in which the UE is ready for communication.

The eNodeB 102 forwards this message 508 to the management entity 103, which, upon receipt of this forwarded UE message 509, can stop the set-up timer 521 again. The redirected UE message 509 may optionally include the time interval in which the UE is ready for communication, which may then be stored in the management entity 103. The management entity 103 can thus trigger a callback, as described in more detail above with reference to FIGS. 1 to 4. Alternatively, the time at which the UE message 509 arrives at the management entity 103 can be detected as a time within the standby cycle 524 of the UE 101. Alternatively, the time interval between start timer 520 and stop timer 521 can be detected as a time interval within the standby cycle 524 of UE 101.

The time at which the UE message 509 arrives at the management entity 103 or the time interval between the start timer 520 and the stop timer 521 not only provides information about the standby cycle 524 of the UE 101 but also about the DRX cycle 522 of the UE 101 and the exact time of the paging event 523. This may also be stored in the management entity 103 to provide in a callback not only the standby cycle 524 but also the DRX cycle 522 and/or the exact interval of the paging event 523 to the communication entity 105 which may like to establish a communication link to the UE 101.

Figure 6:
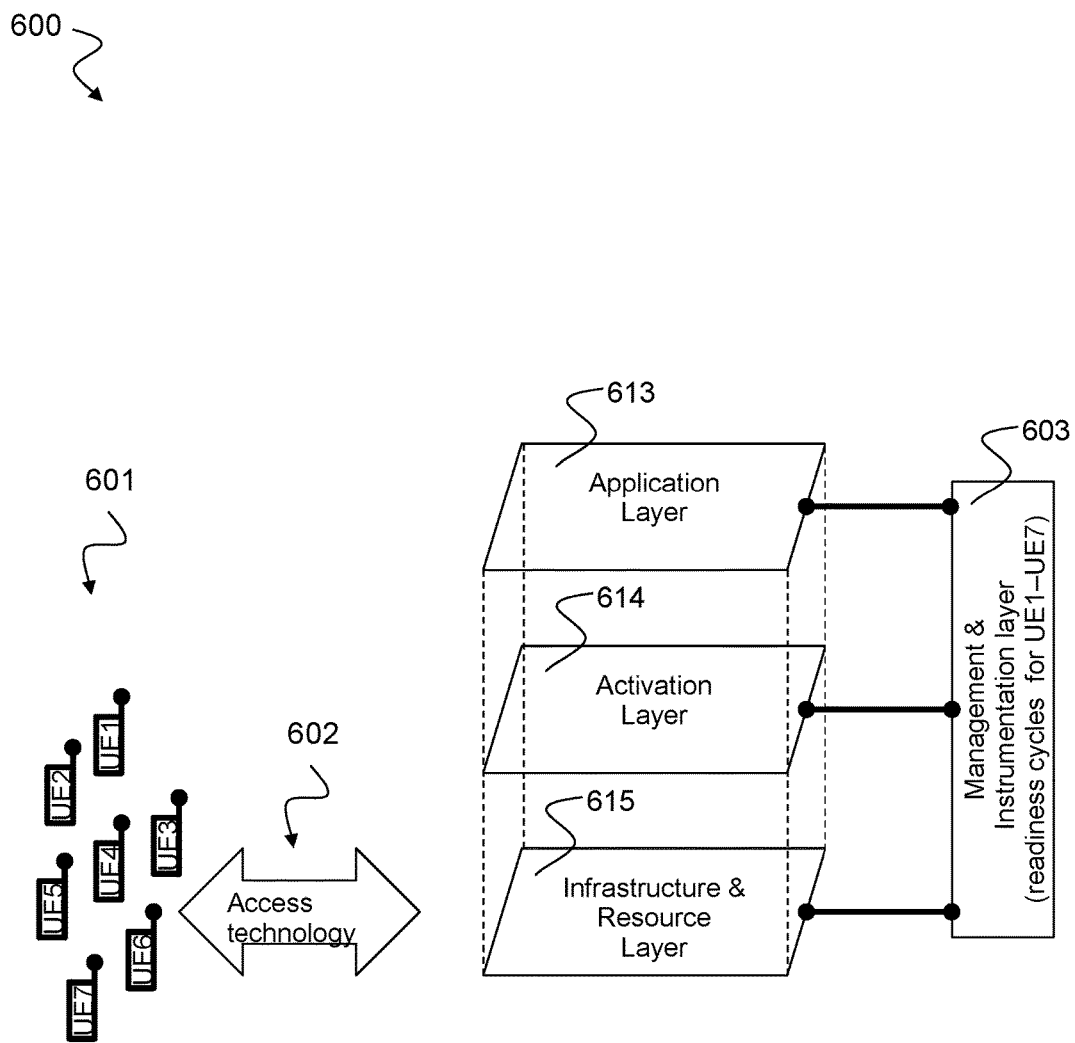
FIG. 6 is a schematic diagram illustrating a layered architecture of a 5G communication network 600 according to an implementation form with a management and instrumentation layer 603 in which an exemplary callback functionality may be implemented.

FIG. 6 shows a schematic diagram illustrating a layered architecture of a 5G communication network 600 or a 5G system architecture, respectively, according to an exemplary implementation form with a management and instrumentation layer 603 in which an exemplary callback functionality may be implemented.

The 5G system architecture 600 includes an area with 5G communication terminals 601 which are connected via different access technologies 602 to a multilayered communication structure. This multilayered communication structure includes an Infrastructure 8z. Resources layer 615, an activation layer 614 and an application layer 613 which are managed by a management & Instrumentation plane 603 in which a callback functionality as described above with respect to FIGS. 1 to 5 may be implemented.

The Infrastructure & Resources layer 615 includes the physical resources of a converged network structure of fixed and mobile network components ("Fixed-Mobile Convergence") with access point, cloud nodes (having processing and storage nodes), 5G devices such as mobile phones, portable devices, CPEs (customer premises equipment), machine communication modules and other network nodes and related links. 5G devices can include multiple and configurable capabilities and act, for example, as a relay or hub or can operate depending on the particular context as a computer or memory resource. These resources are provided to the higher layers 614, 613 and the management & Instrumentation layer 603 via corresponding APIs (application program interfaces). Monitoring the performance and the configurations are inherent to such APIs.

The activation layer 614 includes a library of functions that are needed within a converged network in the form of blocks of a modular architecture. These include functions that are implemented in software modules that can be retrieved from a storage location of the desired location, and a set of configuration parameters for specific parts of the network, for example, the radio access. These features and capabilities can be accessed on demand by the management & Instrumentation layer 603 by using the provided APIs. Certain functions may exist in multiple variants, for example, different implementations of the same functionality having different performance or characteristic.

The various degrees of performance and capabilities can be used to substantially differentiate the network functionality over that what is possible in today's networks, e.g. offering as a mobility function a nomadic mobility or offering a vehicle mobility or air transport mobility depending on the specific needs.

The application layer 613 includes specific applications and services of the network operator, the company, the vertical operator or by third parties who use the 5G network. The interface to the management & Instrumentation layer 603 allows to use certain dedicated network slices for an application, or to assign an application to an existing network slice.

The structure of these dedicated network slices can, for example, be performed by the callback functionality in the management & instrumentation layer 603 only when the UE or the UEs 601 to be communicated are also ready to communicate, i.e. at the predetermined time interval stored in the management & instrumentation layer 603, in which the corresponding UE is ready to communicate.

The management & Instrumentation layer 603 is the contact point for the required use cases (use cases, business models) to put into actual network functions and slices. It defines the network slices for a given application scenario, concatenates the relevant modular network functions, assigns the relevant performance configurations and maps all to the resources of the infrastructure & resources layer 615. The management & Instrumentation layer 603 also manages the scaling of the capacity of these functions as well as their geographical distribution. In certain applications, the management & Instrumentation layer 603 may also have skills that allow third parties to produce and manage their own network slices by the use of APIs. Because of the numerous tasks of the management & Instrumentation layer 603, these are not a monolithic block of functionality but rather a collection of modular functions, integrating progresses that have been achieved in different network domains, such as NFV (network function virtualization), SDN (software-defined networking) or SON (self-organizing networks). The management & Instrumentation Layer 603 utilizes data assisted intelligence to optimize all aspects of service assembly and deployment. One of these modular functions may include the callback functionality described above with respect to FIGS. 1 to 5.

The Infrastructure & Resources layer 615 includes all physical assets that are associated with a network operator, i.e., locations, cable, network nodes, etc. This layer 615 forms the basis for all network slices. It is structured as generic as possible without too many specialized engineering units. The Infrastructure & Resources layer 615 conceals any kind of user-specific implementation towards the upper layers, so that the remaining systems can be used optimally for different slices. Components of the infrastructure and resources layer 615 are based on hardware and software or firmware that is needed for each operation and that is provided to the overlying layers as resource objects. Objects of infrastructure & resources layer 615, for example, include virtual machines, virtual links or connections and virtual networks, for example, virtual access node, virtual network nodes and virtual computer nodes. As the term "virtual" implies, the infrastructure and resources layer 615 provides the objects in the form of an "infrastructure as a service", i.e. in an abstracted, virtualized form to the next higher layer. This providing of objects, controlled by the management and instrumentation layer 603, can be performed within the time interval in which the respective UEs 601 are ready for communication, i.e. within the predetermined time interval as described above with respect to FIGS. 1 to 5.

The activation layer 614 is arranged above the infrastructure & resources layer 615. It uses the objects of the infrastructure & resources layer 615 and adds additional functionality to these objects, for example in the form of (non-physical) software objects/VNFs (virtual network functions) to enable generation of any type of network slices and hence to provide a platform as a service to the next higher layer 613.

This addition of functionality by the activation layer 614 can, for example, be controlled by the management & instrumentation layer 603 at the time when the addressed UEs 601 are also ready for communication, that is, within the predetermined time interval, as described above with reference to FIGS. 1 to 5.

Software objects can exist in any granularity, and may include a tiny or a very large fragment of a network slice. In order to be able to allow the generation of network slices on a suitable level of abstraction in the activation layer 614 different abstract objects can be combined with other abstracted objects and virtual network functions to form combined objects, which can be converted into aggregated objects which can be provided in an object library to the next higher level. Thus, the complexity can be hidden behind the network slices. For example, a user can create a mobile broadband slice and define merely a KPI (Key Performance Indicator) without having to specify specific features such as individual local antenna cover, backhaul links and specific parameterization degrees. Supporting an open environment, allowing to add or delete network functions on demand, is an important skill of the activation layer 614 that supports the dynamic rearrangement of functions and connectivities in a network slice, for example, by using SFC (Service Function Chaining) or modifying software so that the functionality of a slice can be completely pre-defined and can include both approximately static software modules and dynamically addable software modules.

This generation and provision of objects by the activation layer 614 can also be controlled by the management & instrumentation layer 603 at the time when the addressed UEs 601 are also ready for communication, that is, within the predetermined time interval, as described above with reference to FIGS. 1 to 5.

A network Slice can be regarded as software-defined entity that is based on a set of objects that define a complete network. The activation layer 614 plays in the success of this concept a key role since it can include all software objects that are necessary to provide the network slices and the appropriate skills to handle the objects. The activation layer 614 may be considered as a type of network operating system complemented by a network production environment. An important task of the activation layer 614 is defining the appropriate levels of abstraction. So network operators have sufficient freedom to design their network slices while the platform operator can still keep maintaining and optimizing the physical nodes. For example, the execution of everyday tasks such as adding or replacing NodeBs, etc. is supported without the intervention of the network client. The definition of suitable objects that model a complete telecommunications network, is one of the tasks of the activation layer 614 in developing the network slices environment.

The generation of the network slices by the activation layer 614 as described above can also be controlled by the management & instrumentation layer 603 at the time when the addressed UEs 601 are also ready for communication, that is, within the predetermined time interval, as described above with respect to FIGS. 1 to 5.

A network slice, also known as 5G Slice, supports communication services of a certain type of connection with a particular type of handling of the C (Control) and U (User Data) layer. A 5G slice is composed of a collection of different 5G network functions and specific radio access technology (RAT) settings that are combined together for the benefit of the specific use case. Therefore, a 5G Slice spans all domains of the network, for example, software modules that run on a cloud node, specific configurations of the transport network that support a flexible location of functions, a particular radio configuration or even a particular access technology as well as a configuration of 5G devices. Not all slices contain the same features, some features that today seem to be essential for a mobile network can even not occur in some slices. The intention of the 5G Slice is to provide only the functions that are necessary for the specific use case and to avoid any other unnecessary functionalities. The flexibility behind the slice concept is the key to both the widening of existing applications as well as for creating new applications. Third party devices can thus be granted permission to control certain aspects of slicing through appropriate APIs to provide such customized services.

The above described generation and provision of the various network configurations by the activation layer 614 as described above may also be controlled by the management & instrumentation layer 603 at the time the respectively addressed UEs 601 are also ready for communication, i.e. within the predetermined time interval, as described above with respect to FIGS. 1 to 5.

The application layer 403 includes all generated network Slices and offers these as "network as a service" to different network users, for example, different customers. The concept allows the reuse of defined network slices for different users, for example as a new network instance. A network slice, which is associated, for example, with an automotive application can also be used for applications in various other industrial applications. The slices instances, generated by a first user, can for example be independent of the slices instances that were generated by a second user, although the entire network slice functionality may be the same.

Figure 7:
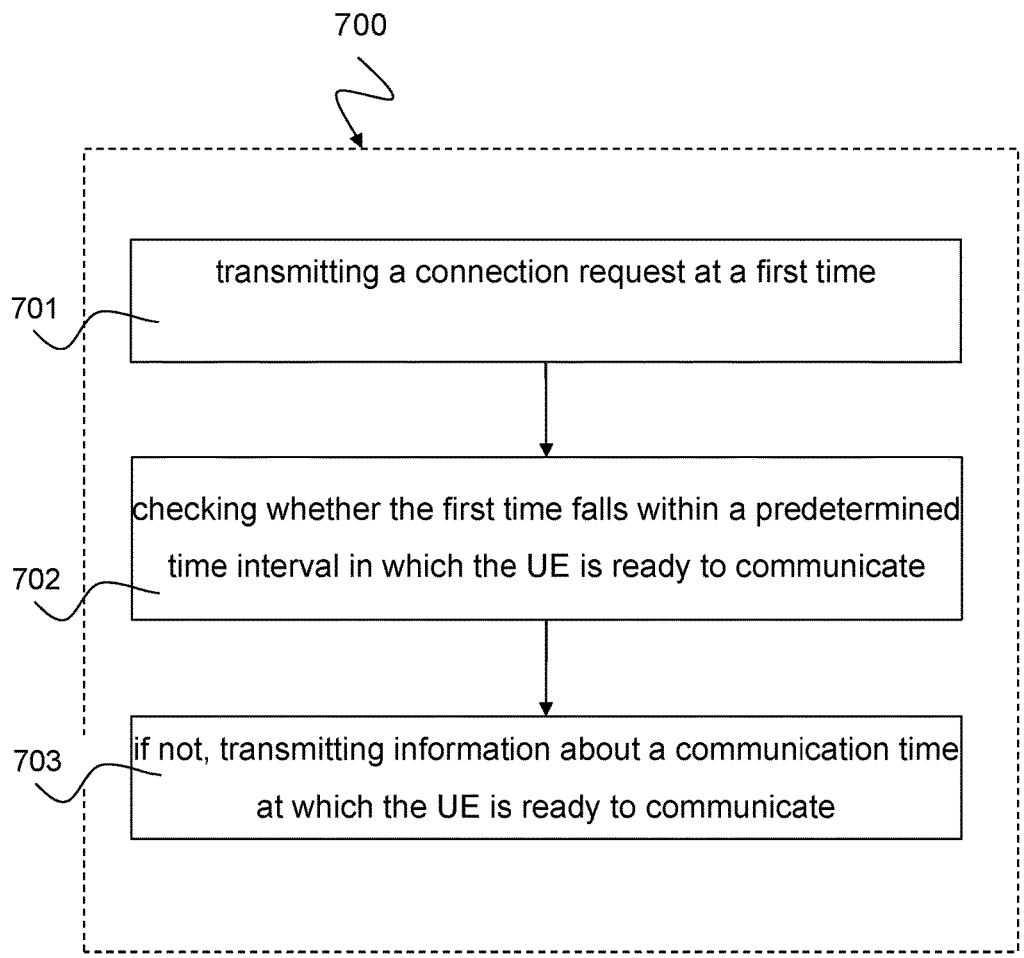
FIG. 7 is a schematic diagram of a method 700 for establishing communication between a communication entity and a communication terminal via a management entity with callback functionality according to an exemplary implementation form.

FIG. 7 shows a schematic diagram of a method 700 for establishing communication between a communication entity and a communication terminal which is ready for communication within a predetermined time interval [tA; tB] via a management entity with callback functionality according to an exemplary implementation form.

The method 700 includes transmitting 701 a connection request, by the communication entity to a management entity at a first time t1, the communication request requesting an establishment of a communication link to the communication terminal, wherein the predetermined time interval [tA; tB] in which the communication terminal is ready to communicate is known to the management entity. The management entity may correspond to the management entity described above with respect to FIGS. 1 to 5.

The method 700 further includes checking 702, by the management entity, whether the first time t1 falls within the predetermined time interval [tA; tB] in which the communication terminal is ready to communicate.

The method 700 includes a further step 703, that is, if the first time t1 does not fall within the predetermined time interval [tA; tB], transmitting 703, by the management entity, information 214 about a communication time in which communication time the communication terminal is ready to communicate, to the communication entity.

The method 700 can, for example, be implemented in a communication network as described with respect to FIGS. 1 to 6.

The communication network 200 may, for example, be a fifth generation (5G) or a further generation network, e.g. as described with respect to FIG. 6.

One aspect of the invention also includes a computer program product that can be directly stored in the internal memory of a digital computer. The computer program product includes computer executable code or computer executable instructions that cause the computer to execute the method 700 described above with respect to FIG. 7 or the actions described above with respect to FIGS. 1 to 6 when running on a computer. Such a computer program product may be stored on a computer suitable non-transitory storage medium storing a program for causing a computer to perform the method 700 or to implement or control the network nodes of the communication networks as described above with respect to FIGS. 1 to 6.

The computer may be a PC (personal computer), for example, a computer of a computer network. The computer can be implemented as a chip, an ASIC, a microprocessor or a signal processor and can be arranged in a communication network, for example in a communication network as described above with respect to FIGS. 1 to 6.

It is to be understood that the features of the various embodiments described herein may be combined with one another unless specifically described otherwise. As illustrated in the description and drawings, individual elements which have been shown in connection are not necessarily in connection with one another; Intermediate elements may be provided between the connected elements. Further, it is to be understood that embodiments of the invention may be implemented in individual circuits, partially in integrated circuits or fully integrated circuits or programming. The term "for example" is meant merely as an example and not necessarily as the best or optimum. Certain embodiments have been illustrated and described herein, but it will be apparent to those skilled in the art that a variety of alternative and/or similar implementations may be embodied in place of the embodiments shown and described without departing from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

100: communication network or communication system
101: terminal, communication terminal, UE
102: eNodeB or base station, BS
103: management entity with callback functionality
104: gateway
105: communication entity
111: connection request
112: forwarding the connection request
113: information with communication time
114: Callback with information about the communication time
200: communication network or communication system
211: connection request (at time t1)
215: forwarding the connection request to communication terminal
214: Callback with information about the communication time
201: processor of the management entity
203: memory of the management entity
220: interface of management entity with communication terminal (via eNodeB)
222: interface of management entity with communication entity
300: communication network or communication system
101a: first access terminal, communication terminal, UE
101b: second access terminal, communication terminal, UE
101c: third access terminal, communication terminal, UE
311: connection request (at time t1)
315a: forwarding the connection request to communication terminal UE1
315b: forwarding the connection request to communication terminal UE2
315c: forwarding the connection request to communication terminal UE3
314: Callback with information about the communication time
301: processor of the management entity
303: memory of the management entity
320: interface of the management entity with the communication terminals (via eNodeBs)
322: interface of the management entity with communication entity
400: communication network or communication system
105a: first communication entity
105b: second communication entity
411a: first connection request (at time t1) of first communication entity
411b: second connection request (at time t2) of second communication entity
415: forwarding the first and second connection requests to a communication terminal
414a: first callback with information about the first communication time Tcom1 to the first communication entity
414b: second callback with information about the second communication time Tcom2 to the second communication entity
401: processor of the management entity
403: memory of the management entity
420: interface of management entity with communication terminal (via eNodeB)
422a: interface of management entity with first communication entity
422b: interface of management entity with second communication entity
500: communication network or communication system
501: paging message
502: paging request
503: RRC: paging
504: Random Access preamble
505: Random Access answer
506: RRC connection request
507: RRC connection establishment
508: RRC connection established and service request
509: UE message
520: start timer
521: stop timer
522: DRX cycle
523: Paging Occasion, PO
524: readiness cycle or standby cycle or predetermined time interval, in which the UE is ready to communicate
525: sleeping cycle of UE
600: 5G system architecture or 5G communication network
601: access terminal, communication terminal, UE
602: access technology
613: application layer
614: activation layer
615: infrastructure & resource layer
603: management & instrumentation layer
700: method for establishing communication between a communication entity and a communication terminal which is ready to communicate within a predetermined time interval
701: first step: transmitting connection request
702: second step: checking if first time falls within predetermined time interval
703: third step: if not, transmitting information about a communication time at which the communication terminal is ready to communicate

The invention claimed is:

1. A communication system, comprising:
a communication terminal configured to be ready to communicate within a predetermined time interval;

a management entity coupled with the communication terminal, wherein the predetermined time interval is stored in the management entity; and a communication entity coupled with the management entity, wherein the communication entity is configured to transmit a connection request for requesting establishment of a communication link to the communication terminal to the management entity at a first time;

wherein the management entity is configured to use a callback function to provide the communication entity with information of (i) a time at which the communication terminal is ready for communication, (ii) a discontinuous reception (DRX) cycle of the communication terminal, and (iii) an exact time of a paging event for paging the communication terminal;

wherein using the callback function to inform the communication entity of the time at which the communication terminal is ready for communication comprises: checking, responsive to the connection request, whether the first time falls within the predetermined time interval, and responsive to determining that the first time does not fall within the predetermined time interval, transmitting, to the communication entity, information about the time at which the communication terminal is ready for communication.

2. The communication system of claim 1, wherein the management entity is configured to forward the connection request of the communication entity to the communication terminal if the first time falls within the predefined time interval.

3. The communication system of claim 1, wherein the information about the communication time comprises a time interval within the predetermined time interval.

4. The communication system of claim 1, wherein the information about the communication time indicates the predetermined time interval.

5. The communication system of claim 1, wherein the communication entity is configured to delay the connection request to the management entity based on the information about the communication time until the first time falls within the predetermined time interval.

6. The communication system of claim 1, further comprising:
a base station, configured to send a paging request to the communication terminal;
wherein the communication terminal is configured to initiate, responsive to the paging request, connection establishment with the base station within the predetermined time interval.

7. The communication system of claim 6, wherein the management entity is configured to update the predetermined time interval based on a message from the communication terminal, the message indicating that the connection to the base station is established.

8. The communication system of claim 7, wherein the message from the communication terminal indicates the predetermined time interval.

9. The communication system of claim 6, wherein the management entity is configured to send a paging message to the base station, wherein the paging message indicates the predetermined time interval; and
wherein the base station is configured to send the paging request to the communication terminal within the time interval indicated by the paging message.

10. The communication system of claim 1, wherein the communication terminal is configured to be in a power save mode at times other than the predetermined time interval in which power save mode a paging request is neither received nor answered.

11. The communication system of claim 1, wherein the management entity is configured to transmit, responsive to a plurality of connection requests of a plurality of communication entities, information to the respective communication entities, the information comprising different communication times within the predetermined time interval.

12. The communication system of claim 1, wherein the communication terminal comprises a sensor configured to sense measurement data and wherein the communication terminal is configured to transmit the measurement data to the communication entity responsive to a control command of the communication entity.

13. The communication system of claim 1, wherein the communication system is a fifth generation (5G) network or a network of a further generation, and wherein the management entity is arranged in a management and instrumentation plane of the communication network.

14. A management entity, comprising:
an interface communicating with a communication terminal, wherein the communication terminal is ready to communicate within a predetermined time interval;
a memory storing information about the predetermined time interval;
an interface communicating with a communication entity for receiving a connection request from the communication entity for requesting establishment of a communication link to the communication terminal at a first time; and
a processor configured to use a callback function to provide the communication entity with information of (i) a time at which the communication terminal is ready for communication, (ii) a discontinuous reception (DRX) cycle of the communication terminal, and (iii) an exact time of a paging event for paging the communication terminal;
wherein using the callback function to inform the communication entity of the time at which the communication terminal is ready for communication comprises: checking, responsive to the connection request of the communication entity, whether the first time falls within the predetermined time interval, and responsive to determining that the first time does not fall within the predetermined time interval, transmitting, to the communication entity, information about the time at which the communication terminal is ready for communication.

15. A method for establishing a communication link between a communication entity and a communication terminal which is ready to communicate within a predetermined time interval, the method comprising:
receiving, by a management entity, a connection request from the communication entity at a first time, the communication request requesting an establishment of a communication link to the communication terminal, wherein the predetermined time interval in which the communication terminal is ready to communicate is known to the management entity;
using, by the management entity, a callback function to provide the communication entity with information of (i) a time at which the communication terminal is ready for communication, (ii) a discontinuous reception (DRX) cycle of the communication terminal, and (iii) an exact time of a paging event for paging the communication terminal;

wherein using the callback function to inform the communication entity of the time at which the communication terminal is ready for communication comprises: checking, responsive to the connection request, whether the first time falls within the predetermined time interval, and responsive to determining that the first time does not fall within the predetermined time interval, transmitting, to the communication entity, information about the time at which the communication terminal is ready for communication.

* * * * *